June 3, 1930.  L. E. MORROW  1,760,882
ATTACHMENT FOR FARM TRACTORS
Filed April 18, 1927
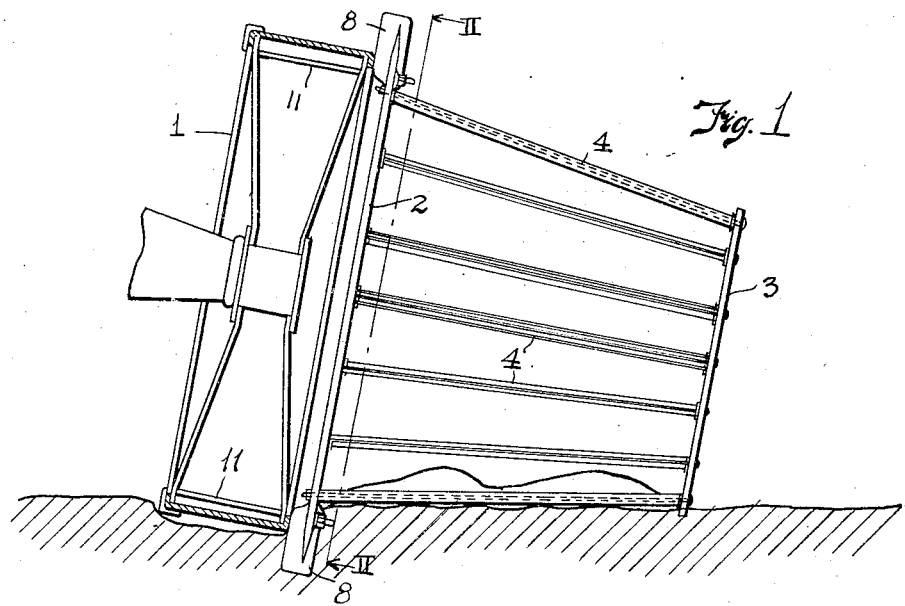
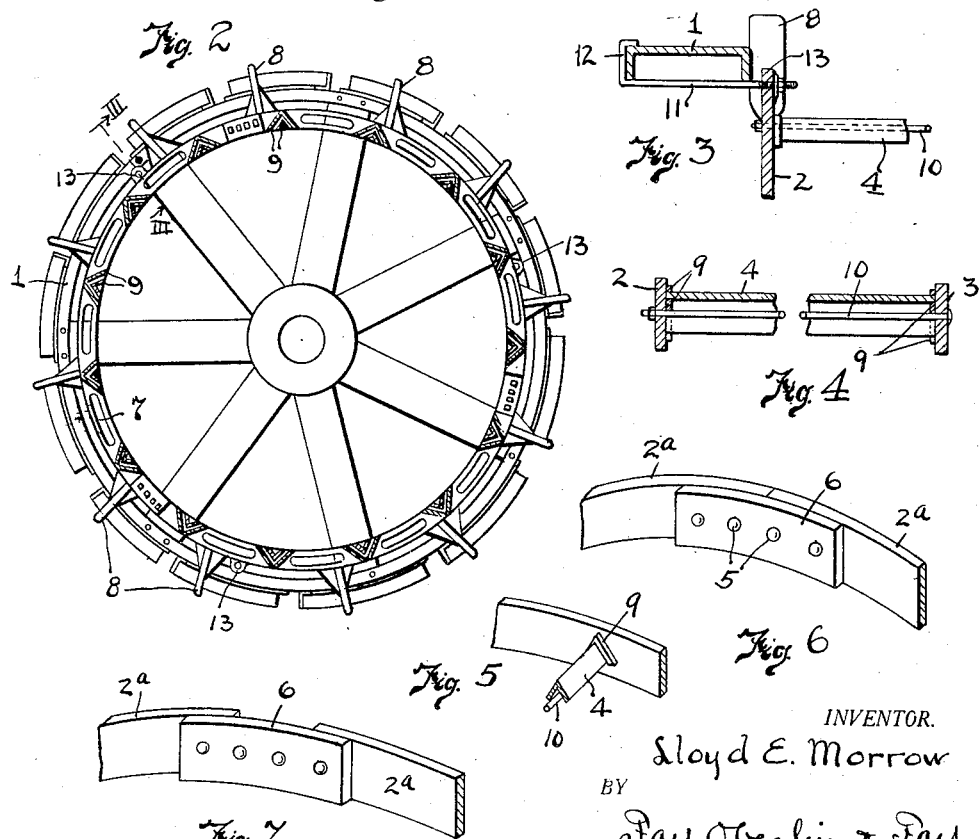
INVENTOR.
Lloyd E. Morrow
BY
Fay, Oberlin & Fay
ATTORNEYS.

Patented June 3, 1930

1,760,882

UNITED STATES PATENT OFFICE

LLOYD E. MORROW, OF MILAN, OHIO

ATTACHMENT FOR FARM TRACTORS

Application filed April 18, 1927. Serial No. 184,601.

This invention relates to agricultural implements, and more particularly to an attachment for tractors, etc., whereby the soil plowed may be further leveled and worked up in an expeditious and effective manner. In devices of the tractor-attachment character heretofore suggested, the tendency has been toward complication of structure and difficulty in securing the device. A construction which can be reliably secured and which is of simple arrangement is accordingly highly desirable.

To the accomplishment of the foregoing and related ends, the invention, then, consists of the features hereinafter described, and particularly pointed out in the claims, the following description and the accompanying drawing setting forth but one of various ways in which the principle of the invention may be applied.

In said annexed drawing:

Fig. 1 is a vertical axial sectional view showing an embodiment of my invention; Fig. 2 is a section taken on a plane indicated by line II—II, Fig. 1; Fig. 3 is a section taken on a plane indicated by line III—III, Fig. 2; Fig. 4 is a sectional detail; and Figs. 5, 6 and 7 are details in perspective.

The reference character 1 in the drawing designates a suitable carrying wheel, for instance the wheel of a tractor of any usual or desired form, and engageable therewith is a ring 2. Arranged in axially spaced relation is a second or outboard ring 3, and extending between the rings are bars 4 having outstanding edges for working up the soil over which the device travels. The outboard ring 3 is preferably smaller than the ring 2 so as to give the device a tapering or coned shape such that the bars 4 when below contacting the soil will extend substantially horizontally as the wheel 1 travels in the furrow. In other words, with the device mounted on a tractor, one of whose wheels is riding in the furrow and the other up at a higher level on the unplowed ground, the inclination is compensated for by the coned shape of the device. Where the outboard ring is not smaller, the device itself carries weight and provides traction irrespective of the tractor wheel, and the leveling of the tractor is thus improved. The support ring 2 may be made as an integral annulus, but I prefer to make it up of sections 2$^a$, connectible end to end, as for instance by bolts 5 and fish-plates 6 on one or both sides. By providing a series of bolt holes, connection may be made with the ring sections closely abutting or spaced apart, whereby the ring may be adjusted to smaller or larger size as desired for deep or shallow plowing requirements. For lightness consistent with strength the metal of the rings may be cut out or skeletonized, as at 7. The ring 3 may similarly be made up in sectional form, or it may be an integral annulus. Outstanding projections or spuds 8 are provided on the rings in any desired way, for instance they may be integral with the metal of which the ring is cast or shaped, and preferably these are set at a retarded angle so that as the wheel travels along, the spuds leave the ground more vertically and thus avoid undue tearing up of the neatly smoothed surface. On the opposing faces of the rings are spaced shoulders 9 forming seats to receive the ends of the bars 4. These may be of somewhat varied character, for instance plain, or angle-iron, or T-bars, but generally the angle-iron type set as a V-bar is preferable. Tie-bolts or the like 10 extend across from ring to ring, and conveniently within the angle bars, to tie the structure together.

The ring 2 is positioned adjacent the wheel 1, with the spuds 8 against the rim thereof, and hook bolts 11 are set with the hook end 12 about the inside edge of the rim of the tractor wheel 1 and the other end of the bolt extending through a lug 13 on the ring, a sufficient number of such bolts being arranged about to provide secure engagement and the device as a whole is so rigid with the supporting wheel 1 as to be for practical purposes a part thereof.

The manner of use of the device will be clear. With furrows being turned over by a plow in connection with the tractor, the detail of this being immaterial, the wheel 1 in its travel along the furrow carries the bars 4 successively against the upturned soil and packs and levels it down, and from the diametral differences involved in the conical shape sufficient relative movement or partial slippage occurs to work the surface into a desirable disintegrated condition, at the same time that the additional furrows are being turned up following.

It will thus be seen that as a whole, the device presents a well balanced and well braced construction such as to most effectively level and work up the soil travelled over.

Other modes of applying the principle of my invention may be employed, change being made as regards the features disclosed, provided the means stated in any of the following claims or the equivalent of such stated means be employed.

I therefore particularly point out and distinctly claim as my invention:—

1. In a device of the character described, a support-ring engageable with a carrying wheel, a second ring spaced therefrom, a plurality of bars having outstanding edges and connecting said rings, brace ties extending between said rings, and take up bolts to connect between the carrying wheel and the support ring.

2. In a device of the character described, a support-ring engageable with the face of a carrying wheel, a second ring spaced therefrom, a plurality of bars of angle iron having outstanding edges and extending between the faces of said rings, and tie-bolts connecting the rings.

3. In a device of the character described, a support-ring engageable with the face of a carrying wheel, said ring being made up of connecting sections having outstanding spuds, an outboard ring spaced from said first-named ring to cover a plurality of furrows, and a plurality of bars of angle iron having outstanding edges and extending between such support-rings shoulders and the outboard ring.

4. In a device of the character described, a support-ring made up of sections connectible end to end, said ring being attachable to a carrying wheel adjacent the rim thereof, an outboard ring of smaller diameter spaced from said first-named ring, seating shoulders on the opposing faces of said rings, and a plurality of bars having outstanding edges and connectible between such shoulders.

5. In a device of the character described, a sectional support-ring engageable with a carrying wheel, an outboard ring of smaller diameter spaced therefrom, a plurality of V-bars extending between said rings, and tie-bolts for holding the rings and bars together.

6. In a device of the character described, a support-ring made up of sections connectible end to end, hook bolts securing said ring to a carrying wheel, outstanding spuds angularly projecting from said ring-sections, an outboard ring of smaller diameter spaced from said first-named ring, seating shoulders on the opposing faces of said rings, a plurality of V-bars extending between such ring shoulders, and tie rods within the V-bars for holding the rings and bars together.

Signed by me this 2d day of April, 1927.

LLOYD E. MORROW.